(12) United States Patent
Tong et al.

(10) Patent No.: US 7,613,865 B2
(45) Date of Patent: Nov. 3, 2009

(54) AUTOMATED SWITCHING FOR EXECUTING TESTS INVOLVING ELECTRONIC DEVICES

(75) Inventors: Zili Tong, Beijing (CN); Kaisuo Lu, Beijing (CN); Hua Zhang, Beijing (CN)

(73) Assignee: Microsoft Corporation, Redmond, WA (US)

( * ) Notice: Subject to any disclaimer, the term of this patent is extended or adjusted under 35 U.S.C. 154(b) by 682 days.

(21) Appl. No.: 11/276,142

(22) Filed: Feb. 15, 2006

(65) Prior Publication Data

US 2007/0201372 A1    Aug. 30, 2007

(51) Int. Cl.
G06F 13/00    (2006.01)
(52) U.S. Cl. .................. 710/316; 370/241; 702/121
(58) Field of Classification Search .......... 370/241, 370/242, 244, 245, 246, 247, 250, 251; 702/108, 702/121; 710/100, 305, 316
See application file for complete search history.

(56) References Cited

U.S. PATENT DOCUMENTS

| | | | |
|---|---|---|---|
| 6,931,575 B2 * | 8/2005 | Smith et al. | 714/44 |
| 7,191,277 B2 * | 3/2007 | Broyles | 710/316 |
| 2003/0023900 A1 * | 1/2003 | Smith et al. | 714/25 |
| 2006/0227759 A1 * | 10/2006 | Bohm et al. | 370/351 |
| 2007/0168729 A1 * | 7/2007 | Chan | 714/30 |

\* cited by examiner

Primary Examiner—Chi H Pham
Assistant Examiner—Weibin Huang (57) ABSTRACT

An automated switching system that enables a tester to establish different connections between multiple electronic devices is provided. The system includes a switching module that connects to the electronic devices. The switching module may be controlled to automatically couple the electronic devices to the testing device in different configurations. The switching module may include radio ports for selectively coupling devices one at a time and check ports for concurrently coupling one or more of the devices. The system may also be configured to provide a time-varying coupling between the tester and the electronic devices.

15 Claims, 8 Drawing Sheets

AUTOMATED SWITCHING FOR EXECUTING TESTS INVOLVING ELECTRONIC DEVICES

BACKGROUND

Interaction between software and hardware is an important aspect in computing related testing. A software component on a host is often tested to determine whether a particular electronic device can successfully interact with that component. For example, a test may be performed to determine whether an operating system and an electronic device can properly interact with each other using a certain driver. This kind of compatibility testing is especially important for an operating system with automatic configuration capabilities, such as plug and play functions. An effective test may be designed to determine the behavior of a host when multiple devices are connected to different ports on the host. The electronic devices in the test may include Universal Serial Bus (USB) devices, IEEE 1394 devices, etc.

SUMMARY

The following presents a simplified summary of the disclosure in order to provide a basic understanding to the reader. This summary is not an extensive overview of the disclosure and it does not identify key/critical elements of the invention or delineate the scope of the invention. Its sole purpose is to present some concepts disclosed herein in a simplified form as a prelude to the more detailed description that is presented later.

The present example provides an automated switching system that enables a tester to establish different connections to multiple electronic devices. The system includes a switching module that connects to the electronic devices. The switching module may be controlled to automatically couple the electronic devices to the tester in different configurations. The switching module may include radio ports for selectively coupling devices one at a time and check ports for concurrently coupling one or more of the devices. The system may also be configured to provide a time-varying coupling between the tester and the electronic devices. For example, the system may simulate quickly plugging the electronic devices in and out by setting a time interval and a loop connection setting.

Many of the attendant features will be more readily appreciated as the same becomes better understood by reference to the following detailed description considered in connection with the accompanying drawings.

DESCRIPTION OF THE DRAWINGS

The present description will be better understood from the following detailed description read in light of the accompanying drawings, wherein.

Like reference numerals are used to designate like parts in the accompanying drawings.

DETAILED DESCRIPTION

The detailed description provided below in connection with the appended drawings is intended as a description of the present examples and is not intended to represent the only forms in which the present example may be constructed or utilized. The description sets forth the functions of the example and the sequence of steps for constructing and operating the example. However, the same or equivalent functions and sequences may be accomplished by different examples.

Although the present examples are described and illustrated herein as being implemented in a system for switching Universal Serial Bus (USB) connections for testing electronic devices, the system described is provided as an example and not a limitation. As those skilled in the art will appreciate, the present examples are suitable for application in a variety of different types of systems for automated switching of electronic device connections.

Figure 1:
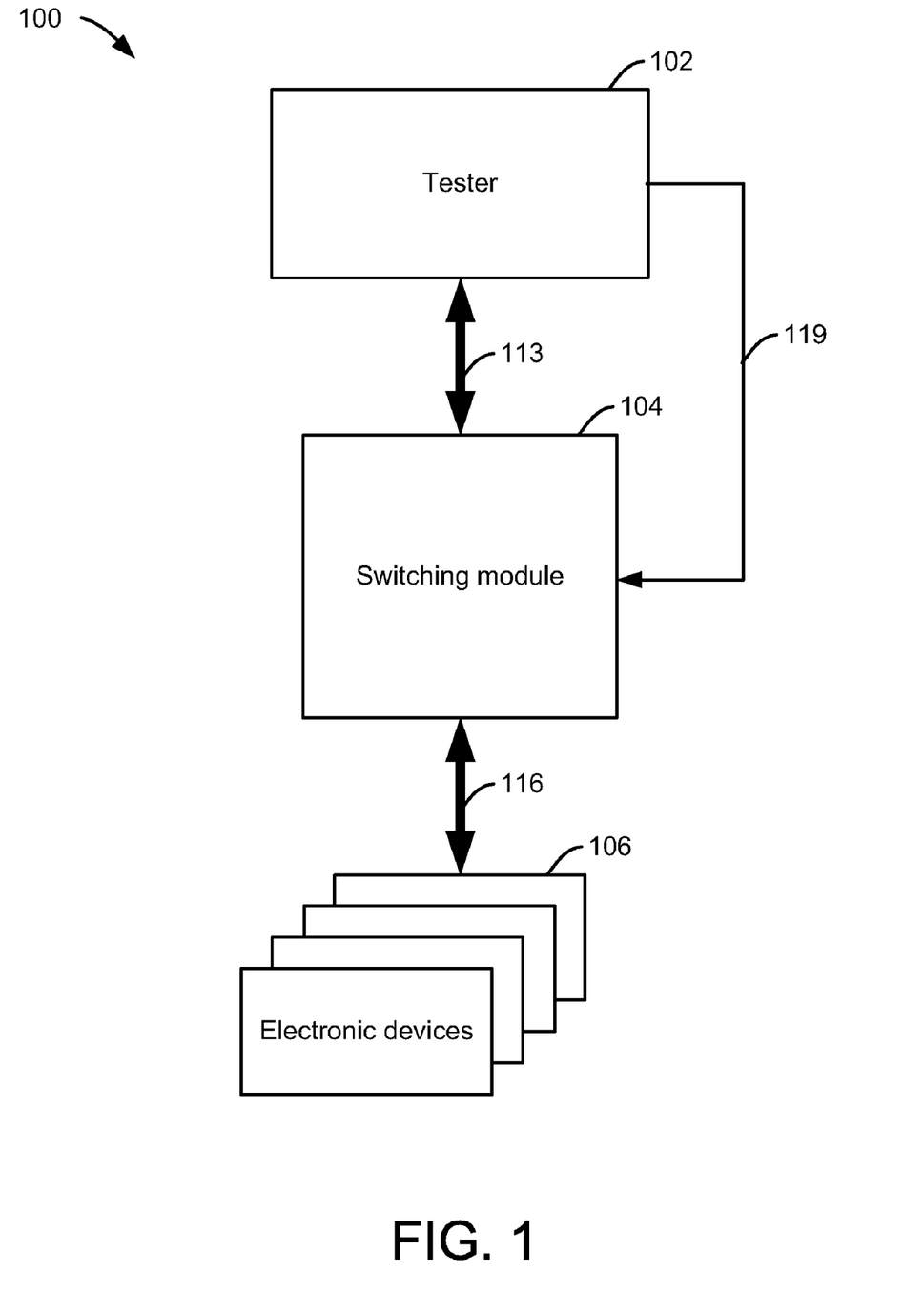
FIG. 1 shows an example system for switching connections to electronic devices undergoing testing.

FIG. 1 shows an example system 100 for switching connections to electronic devices 106 undergoing testing. System 100 includes tester 102, switching module 104, and electronic devices 106. Tester 102 is a computing device configured to perform tests associated with electronic devices 106. Tester 102 may be configured to test the behavior of an executable component, such as an operating system or an application, when a connection is established with one or more of the electronic devices 106. For example, tester 102 may be configured to test an automatic configuration feature, such as plug and play functionalities. Tester 102 may also be configured to perform stress testing, such as repeatedly connecting and disconnecting a device. Tester 102 may further be configured to test other functionalities, such as device installing and uninstalling processes, hub controller performance, device status indication, or the like.

To efficiently perform these tests, tester 102 is configured to control switching module 104 to establish and manage the connection between electronic devices 106 and tester 102. In one example implementation, connection 119 is established between tester 102 and switching module 104. Tester 102 is configured to determine the coupling configuration to electronic devices 106 for a test. The coupling configuration may include which electronic device is connected to which port and for how long. Tester 102 is also configured to send control signals to switching module 104 using connection 119 to establish the coupling configuration. Connection 119 may be any type of connections, such as a serial port connection.

Switching module 104 is configured with input mechanisms to enable electronic devices 106 to be connected to the module. In this example, input ports, such as Universal Serial Bus (USB) ports, are provided by switching module 104. Electronic devices 106 are connected to switching module 104 through connections 116. Switching module 104 is also configured with output ports to enable tester 102 to be connected to the module. Connections 113 are established between switching module 104 and tester 102.

Connections 116 may be established by connecting the electronic devices with the input ports on switching module 104. Connections 113 may be established by connecting ports on tester 102 with the output ports on switching module 104 with cables. Tester 102 determines which electronic devices are to be connected and sends control signals via connection 119. Switching module receives the control signals and, in response, couples the electronic devices to tester 102 in accordance with the control signals.

Figure 2:
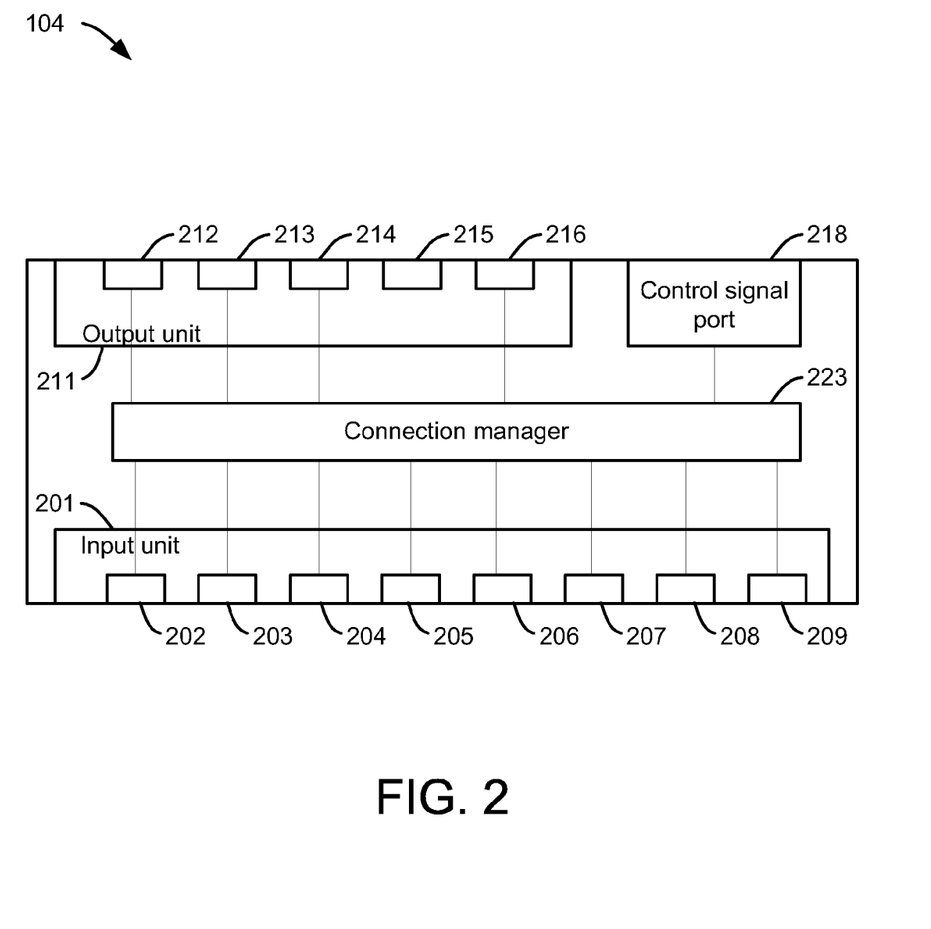
FIG. 2 shows an example switching module.

FIG. 2 shows an example switching module 104. As shown in FIG. 2, switching module 104 may include input unit 201, output unit 211, control signal port 218, and connection manager 223. In this example, input unit 201 includes USB ports 202-209 for establishing connections with electronic devices for testing. Output unit 211 includes USB ports 212-216 for establishing connections with a computing device that performs the testing. Connection manager 223 is configured to receive control signals from control signal port 218. The tester may provide the control signals to connection manager 223 by connecting to control signal port 218. The tester generates the control signals based on which electronic devices are to be tested and how these devices are to be connected to the testing device. Connection manager 223 is configured to arrange the connections between USB ports 212-216 and USB ports 202-209 based on the received control signals.

In operation, multiple electronic devices are connected to switching module 104 at USB ports 202-209. USB ports on the tester are connected to switching module 104 at USB ports 212-216. The tester may identify that a certain electronic devices is to be connected to a particular USB port on the tester for a specified period of time. The tester sends a control signal to switching module 104, which couples the identified electronic device to the particular USB port on the tester. Specifically, coupling mechanisms in connection manager 104 may electrically couple the input port corresponding to the identified electronic device and the output port corresponding to the USB port on the tester. Any type of coupling mechanism controllable by a signal may be used. An example coupling mechanism of switching module 104 will be discussed below in conjunction with FIG. 3.

For illustrative purposes, the example switching module 104 shown in FIG. 2 only includes 8 input ports and 5 output ports. In actual implementation, switching module 104 may include more, less or different number of input and output ports. Also, the example in FIG. 2 includes USB ports. However, the switching module 104 may include other ports, such as IEEE 1394 ports or the like. The functionalities provided by the example switching module 104 enable different electronic devices to be connected to a tester in different configurations by simply sending control signals. These functionalities allow the tester to efficiently test multiple electronic devices without the need to plug and unplug the devices to create the desire coupling configurations. The switching functionalities also allow the tester to create time-varying coupling configurations that can be useful in stress testing.

Figure 3:
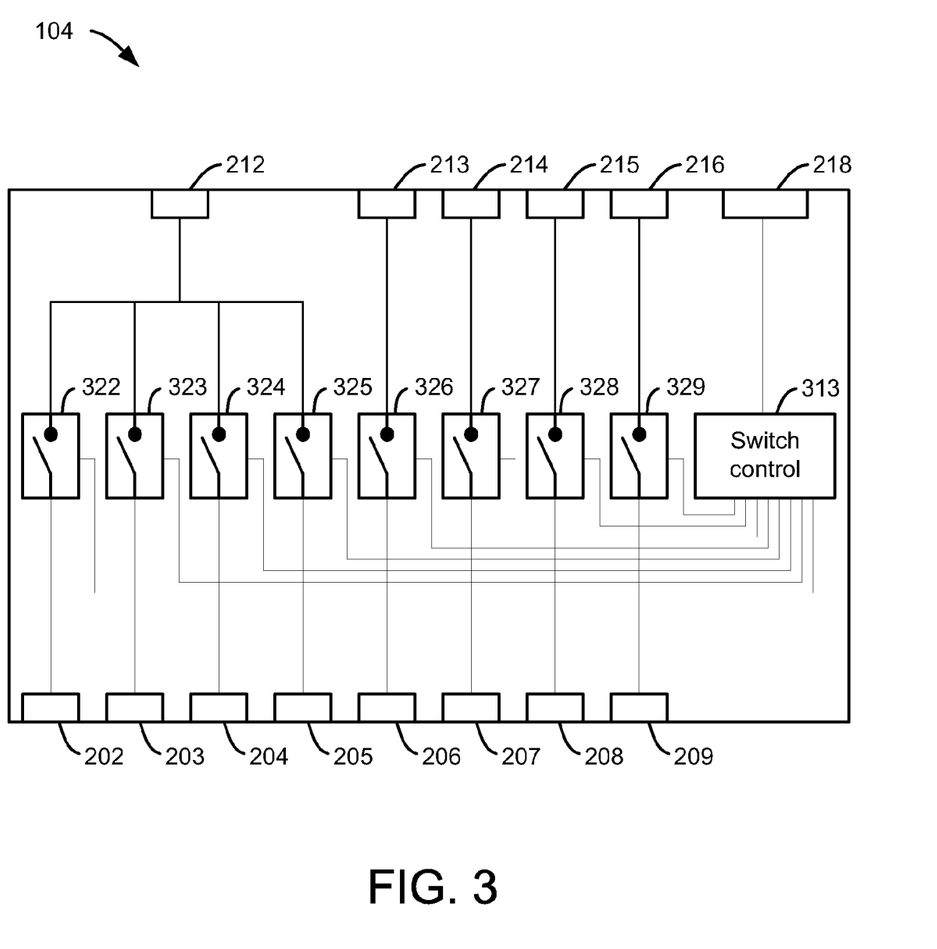
FIG. 3 shows an example coupling mechanism for the switching module.

FIG. 3 shows an example coupling mechanism for the switching module 104. As shown in FIG. 3, switching module 104 includes switches 322-329 and switch control 313. Input USB ports 202-209 are connected to switches 322-329, respectively. Switches 322-329 are controlled by switch control 313, which is configured to receive control signals through control signal port 218. Switch control 313 is configured to open or close switches 322-329 in response to control signals to generate different coupling configurations.

In this example, input USB ports 202-205 are configured in a radio (i.e. parallel) configuration so that only one of these ports are coupled to output USB port 212 at a time. Input USB ports 206-209 are configured in a check (i.e. serial) port configuration so that one or more of the output USB ports 206-209 may be concurrently coupled to the corresponding output ports 213-216. The inclusion of radio ports 202-205 and check ports 206-209 enables different kinds of tests to be performed using switching module 104. In one example implementation, if a port in one of the configuration is selected, none of ports in the other configuration can be connected.

Figure 4:
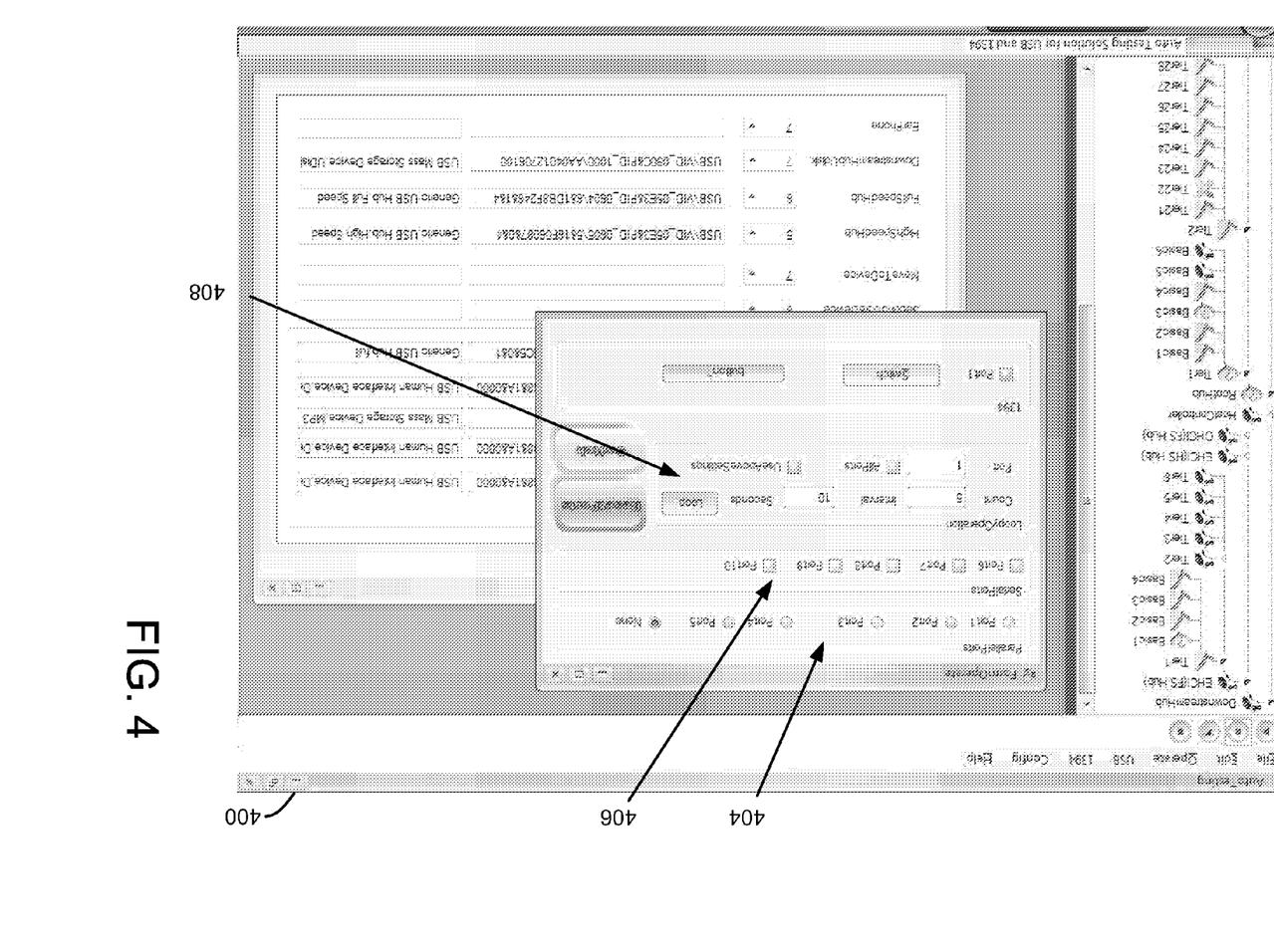
FIG. 4 shows a screenshot of an example user-interface for configuring a switching module.

FIG. 4 shows a screenshot 400 of an example user-interface for configuring a switching module. The user-interface may be provided by a testing application on a tester. The user-interface includes a radio port selection area 404 for selecting an input USB port to be connected. In this example, the switching module includes five input USB ports that can be connected to an output USB port, which is connected to the tester. In radio port selection area 404, a selection can be made to connect any of the radio ports or none of them.

The user-interface also includes a check port selection area 406 for selecting other input USB ports to be connected. For this example, the switching module includes five input USB ports that can be connected to five output USB ports. These output USB ports are also connected to a tester. A loop selection area 408 is included for selecting repetitive and time-dependent coupling, which is useful for stress-testing. As shown in FIG. 4, the loop selection area 408 enables the selection of one or more input USB ports to be connected, the count (i.e. the number times) for connecting and disconnecting the selected ports, the interval between repetitions, or the like.

Figure 5:
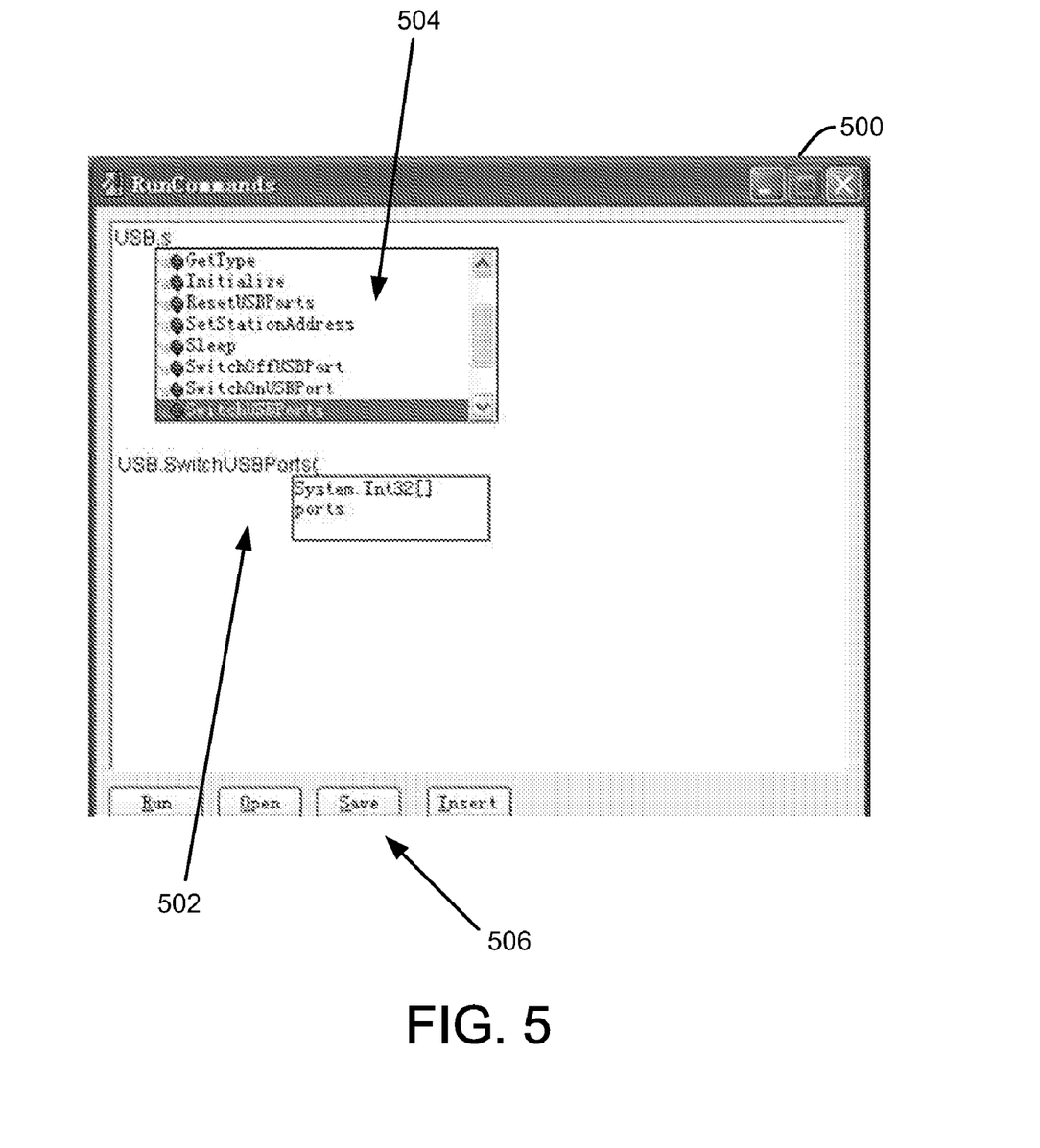
FIG. 5 shows a screenshot of an example user-interface for configuring a test using a switching module.

FIG. 5 shows a screenshot 500 of an example user-interface for configuring a test using a switching module. As shown in FIG. 5, the user-interface includes a script area 502 for structuring commands that cause control signals to be sent to the switching module for a test. In this example, a command script can be built with commands provided in command selection area 504. The command script may be saved, retrieved, edited and run with action triggers 506.

Figure 6:
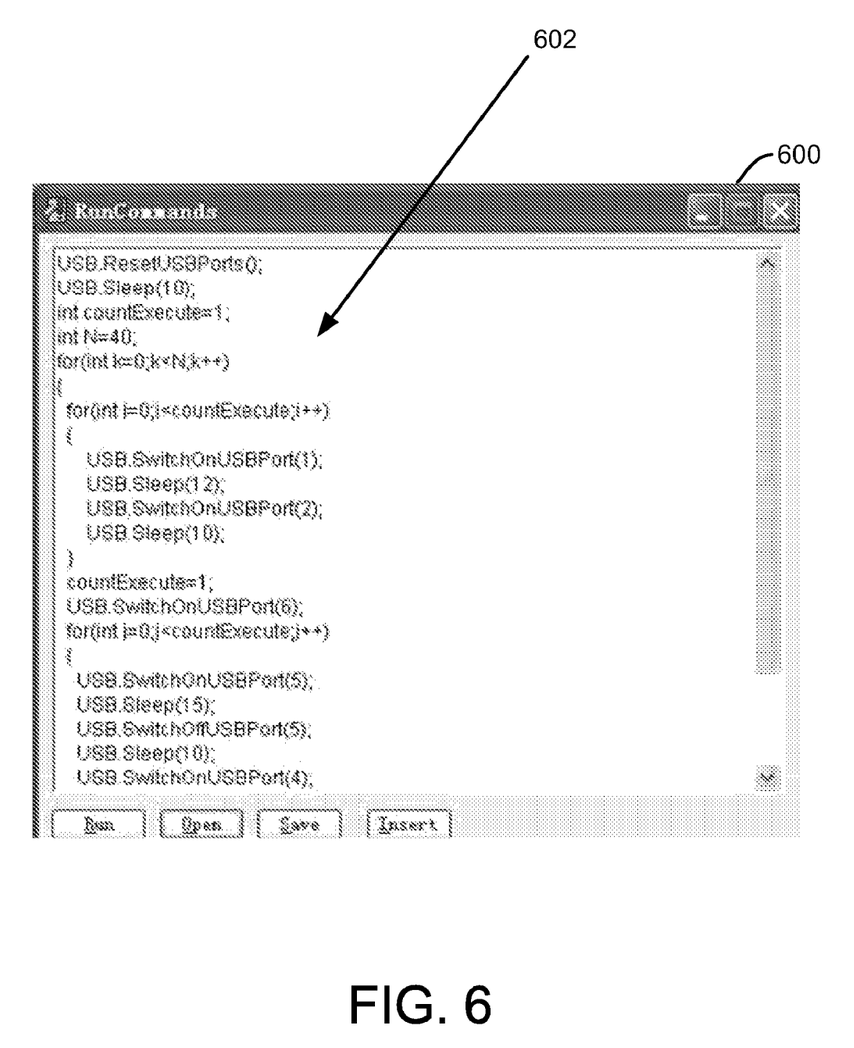
FIG. 6 shows another screenshot of the example user-interface shown in FIG. 5.

FIG. 6 shows another screenshot 600 of the example user-interface shown in FIG. 5. Screenshot 600 shows that a command script has been generated with the user-interface for controlling the switching module. The command script includes a loop operation for repetitive testing. The command script also includes resetting the USB ports, switching multiple USB ports on and off for different lengths of time, and other operations. As shown in FIG. 6, the test is very complicated and includes different USB devices being connected and disconnected multiple times at different intervals. The switching system described herein enables this test to be automatically performed in an accurate and efficient manner.

Figure 7:
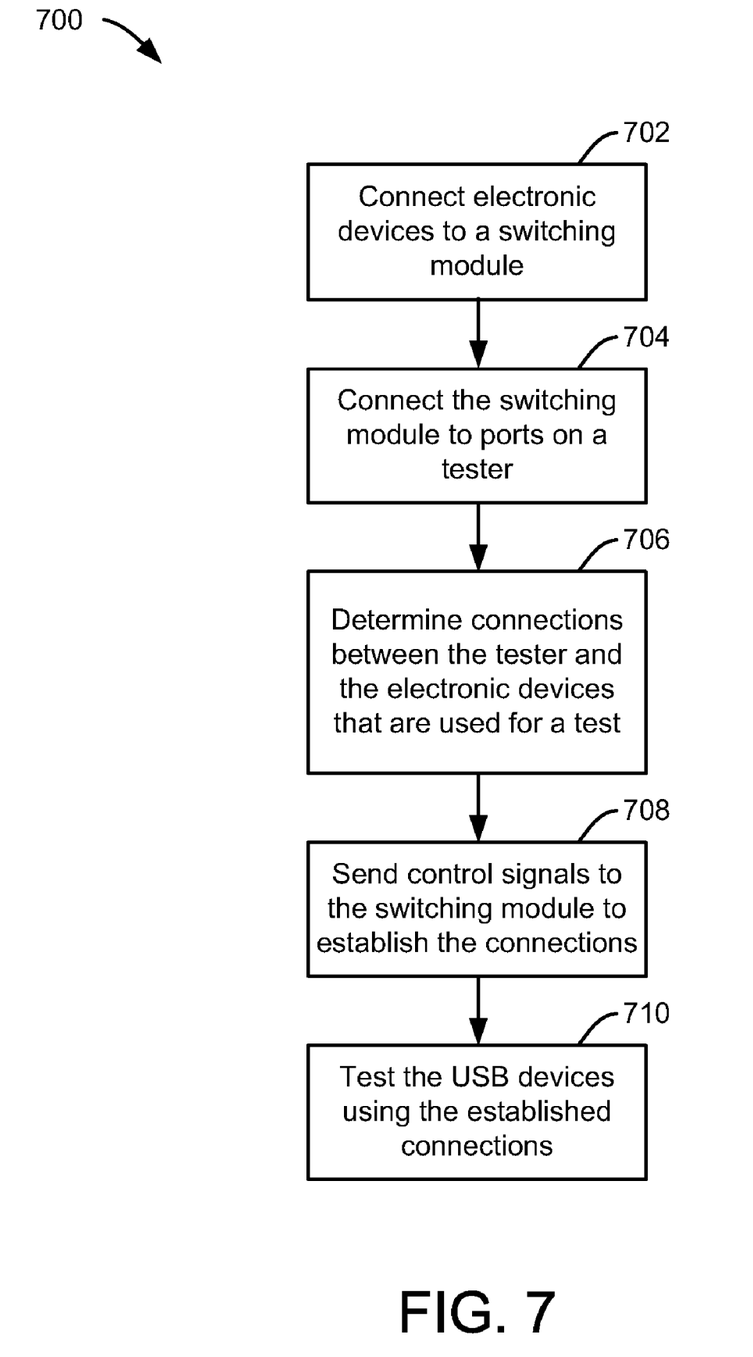
FIG. 7 shows an example process for configuring a test involving electronic devices using a switching module.

FIG. 7 shows an example process 700 for configuring a test involving electronic devices using a switching module. At block 702, electronic devices are connected to a switching module. The electronic devices may be connected by any type of connections, such as USB, IEEE 1394, or the like. At block 704, the switching module is connected to ports on a tester. At block 706, connections between the tester and the electronic devices are determined. The connections are typically determined based on the parameters of the test to be conducted. The connections may cause one or more of the devices to be connected for a pre-determined interval. At block 708, control signals to the switching module are sent to establish the connection. The control signals may be sent via a separate connection, such as a serial port connection. At block 710, the USB devices are tested using the established connections.

Figure 8:
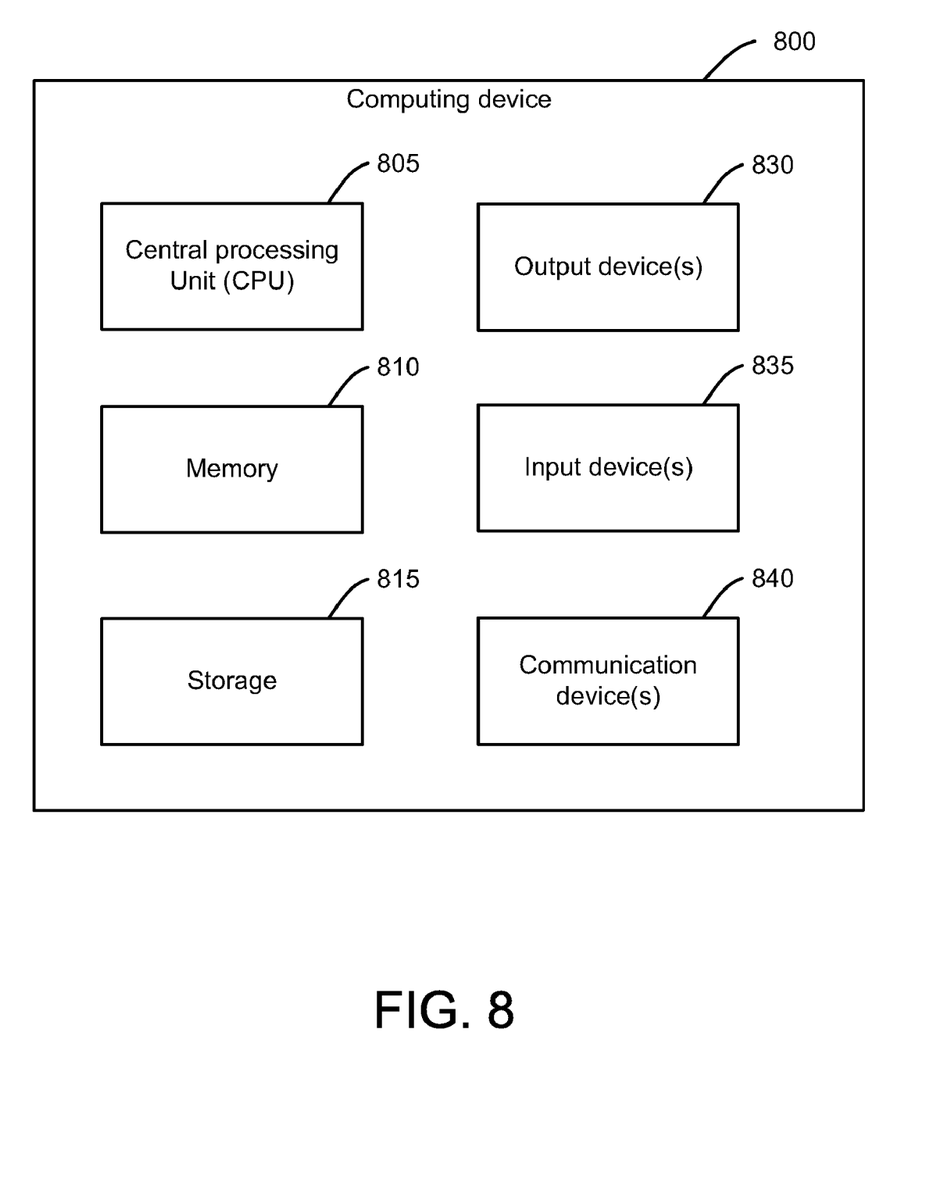
FIG. 8 shows an exemplary computer device for implementing the described systems and methods.

FIG. 8 shows an exemplary computer device 800 for implementing the described systems and methods. In its most basic configuration, computing device 800 typically includes at least one central processing unit (CPU) 805 and memory 810.

Depending on the exact configuration and type of computing device, memory 810 may be volatile (such as RAM), non-volatile (such as ROM, flash memory, etc.) or some combination of the two. Additionally, computing device 800 may also have additional features/functionality. For example, computing device 800 may include multiple CPU's. The described methods may be executed in any manner by any processing unit in computing device 800. For example, the described process may be executed by both multiple CPU's in parallel.

Computing device 800 may also include additional storage (removable and/or non-removable) including, but not limited to, magnetic or optical disks or tape. Such additional storage is illustrated in FIG. 8 by storage 815. Computer storage media includes volatile and nonvolatile, removable and non-removable media implemented in any method or technology for storage of information such as computer readable instructions, data structures, program modules or other data. Memory 810 and storage 815 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by computing device 800. Any such computer storage media may be part of computing device 800.

Computing device 800 may also contain communications device(s) 840 that allow the device to communicate with other devices. Communications device(s) 840 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer-readable media as used herein includes both computer storage media and communication media. The described methods may be encoded in any computer-readable media in any form, such as data, computer-executable instructions, and the like.

Computing device 800 may also have input device(s) 835 such as keyboard, mouse, pen, voice input device, touch input device, etc. Output device(s) 830 such as a display, speakers, printer, etc. may also be included. All these devices are well know in the art and need not be discussed at length.

Those skilled in the art will realize that storage devices utilized to store program instructions can be distributed across a network. For example a remote computer may store an example of the process described as software. A local or terminal computer may access the remote computer and download a part or all of the software to run the program. Alternatively the local computer may download pieces of the software as needed, or distributively process by executing some software instructions at the local terminal and some at the remote computer (or computer network). Those skilled in the art will also realize that by utilizing conventional techniques known to those skilled in the art that all, or a portion of the software instructions may be carried out by a dedicated circuit, such as a DSP, programmable logic array, or the like.

The invention claimed is:

1. An apparatus comprising:
input Universal Serial Bus (USB) ports configured to receive connections from electronic devices;
output USB ports configured to provide connections to a tester for performing a test associated with the electronic devices; and
a connection manager configured to receive control signals, the connection manager further configured to electrically couple at least one of the input USB ports with at least one of the output USB ports in response to the control signals, wherein the connection manager electrically couples the USB ports according to a coupling configuration that includes a loop.

2. The apparatus as recited in claim 1, further comprising a control signal port configured to receive the control signals.

3. The apparatus as recited in claim 2, wherein the connection manager is configured to couple at least one of the input ports with at least one of the output ports for a specified interval in response to at least one of the control signals.

4. The apparatus as recited in claim 2, wherein the control signal port is coupled to a port on the tester to establish a connection with the tester.

5. The apparatus as recited in claim 4, wherein the control signal port is at least one of a serial port, a USB port, or an IEEE 1394 port.

6. The apparatus as recited in claim 1, wherein the connection manager further comprising:
switches connecting the input USB ports and the output USB ports; and
a switch control configured to turn the switches on or off in response to the control signals.

7. The apparatus as recited in claim 1, wherein at least one of the input ports and at least one of the output ports are connected in a radio configuration.

8. The apparatus as recited in claim 1, wherein at least one of the input ports and at least one of the output ports are connected in a check configuration.

9. The apparatus as recited in claim 1, wherein the input ports and the output ports are connected in configurations that include both a radio configuration and a check configuration.

10. One or more computer readable storage media encoded with device-executable instructions for performing steps comprising:
connecting electronic devices to a switching module;
connecting the switching module to ports on a tester;
determining connections between the tester and the electronic devices based, at least in part, on parameters associated with a test involving the electronic devices;
identifying control signals corresponding to the determined connections; and
providing the control signals to the switching module, wherein the control signals cause a coupling configuration that includes a loop.

11. The one or more computer readable storage media as recited in claim 10, further comprising performing a test of the electronic devices with the connections.

12. The one or more computer readable storage media as recited in claim 10, wherein the ports include at least one of USB ports and IEEE 1394 ports.

13. The one or more computer readable storage media as recited in claim 10, wherein the control signals cause at least one of the electronic devices to be connected to a port on the tester for a pre-determined interval.

14. The one or more computer readable storage media as recited in claim 10, wherein the control signals cause multiple the electronic devices to be connected to different ports in a time-varying manner.

15. The one or more computer readable storage media as recited in claim 10, further comprising:

identifying a script including commands corresponding to a coupling configuration; and generating the control signals based, at least in part, on the script.

\* \* \* \* \*